Figure 1:
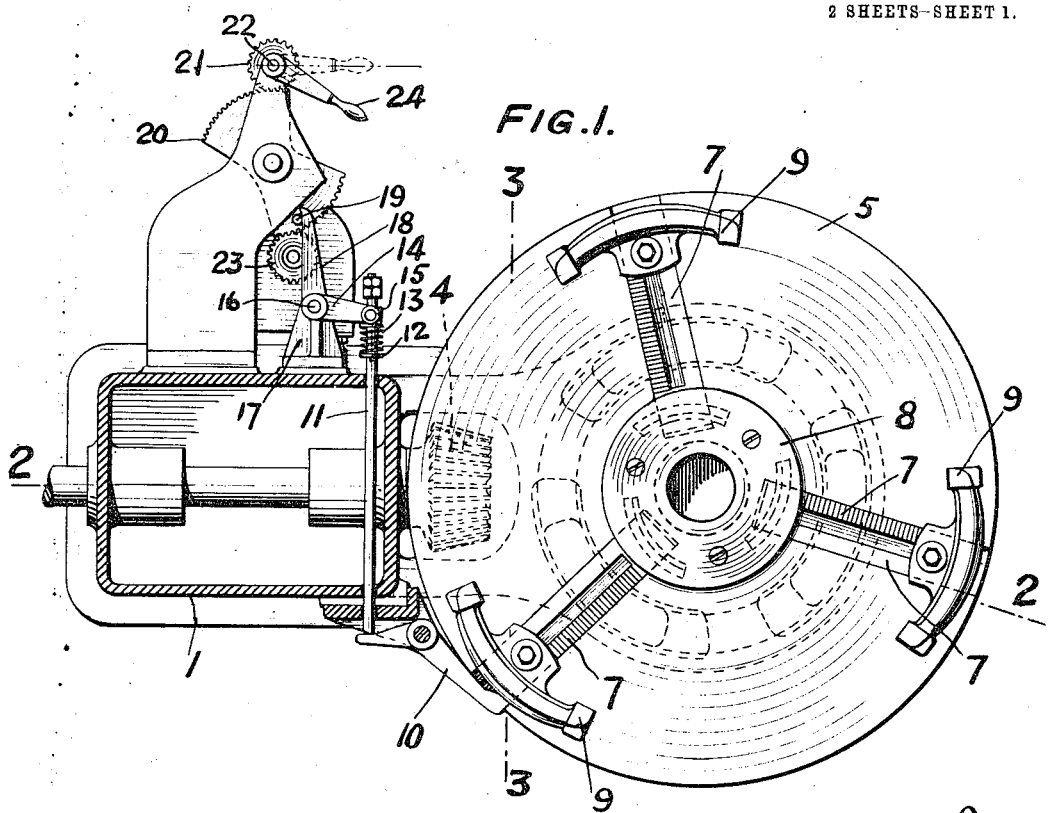

L. H. VOLD.
AUTOMATIC CHUCK FOR BORING AND TURNING MILLS.
APPLICATION FILED JULY 19, 1910.

981,724.

Patented Jan. 17, 1911.

2 SHEETS—SHEET 1.

WITNESSES:

INVENTOR
Lars H. Vold
BY
Harding & Harding
ATTORNEYS

L. H. VOLD.
AUTOMATIC CHUCK FOR BORING AND TURNING MILLS.
APPLICATION FILED JULY 19, 1910.

981,724.

Patented Jan. 17, 1911.

2 SHEETS—SHEET 2.

UNITED STATES PATENT OFFICE.

LARS H. VOLD, OF WESTVILLE, NEW JERSEY, ASSIGNOR TO WILLIAM SELLERS & COMPANY, INCORPORATED, OF PHILADELPHIA, PENNSYLVANIA, A CORPORATION OF PENNSYLVANIA.

AUTOMATIC CHUCK FOR BORING AND TURNING MILLS.

981,724.  Specification of Letters Patent.  Patented Jan. 17, 1911.

Application filed July 19, 1910.  Serial No. 572,689.

*To all whom it may concern:*

Be it known that I, LARS H. VOLD, a citizen of the United States, residing at Westville, county of Gloucester, and State of New Jersey, have invented a new and useful Improvement in Automatic Chucks for Boring and Turning Mills, of which the following is a full, clear, and exact description, reference being had to the accompanying drawings, which form a part of this specification.

My invention relates to driving and chucking machinery for boring-mills, which may have to perform the same operation successively on a number of similar pieces. For this purpose, a centering-chuck driven by power is used. A good example of this form of chuck may be described to consist of three radial arms fitted to slots in the table and operated by a central cam plate, which engages with the arms, causing them to move radially. These arms are usually provided with adjustable jaws, which can be set for work of various diameters, such as car-wheels or tires. This centering chuck was originally opened and closed by hand; but later means were provided to close the chuck automatically, in the action of starting, by the power required for boring or turning, and to open the chuck by the sudden arrest of the driving mechanism, this action being produced by the friction and inertia of the parts. This invention is described and claimed in the patent to Lewis, No. 454,801, of June 23, 1891, in which the driving mechanism turns a cam-plate which moves the arms carrying the chuck jaws into engagement with the work until the resistance to further tightening becomes so great that the table is started by the cam-plate acting against the arms, and in which, when a brake is applied to the driving mechanism, thus checking the movement of the cam-plate, the table, continuing to rotate by its own inertia, retracts the arms to release the chuck jaws from the work. This automatically operating form of chuck is ordinarily operative and satisfactory, but under certain conditions the elements of friction and inertia are not always reliable. For example, the force of the cut may be sufficient to lock the chuck so tightly that the inertia of the table in stopping will not be sufficient to overcome the friction; especially if the nature of the material is such that a slow cutting speed is requisite.

The object of the invention is to provide, in connection with the means for tightening the chuck automatically as described, a contrivance adapted to operate, when the driving mechanism is reversed, to hold the table from movement, thereby effecting the opening of the chuck, which contrivance is rendered inoperative, as soon as the chuck is opened, to permit the table to rotate with the driving mechanism.

Another object of the invention is to permit the table-locking contrivance to be moved by hand into position to operate and then to be applied and released as described without further operation of the hand-control.

Another object of the invention is to provide for the described hand-operation of the table-locking contrivance by means of the same controller by which the reversal of the driving mechanism is effected.

The mechanism for effecting the foregoing object is illustrated in the accompanying drawings, in which—

Figure 2:
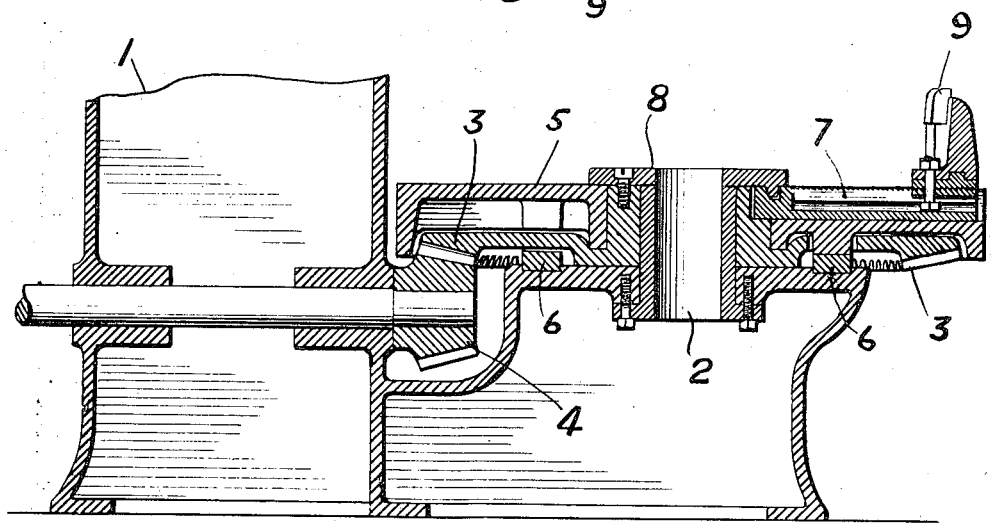
Figure 3:
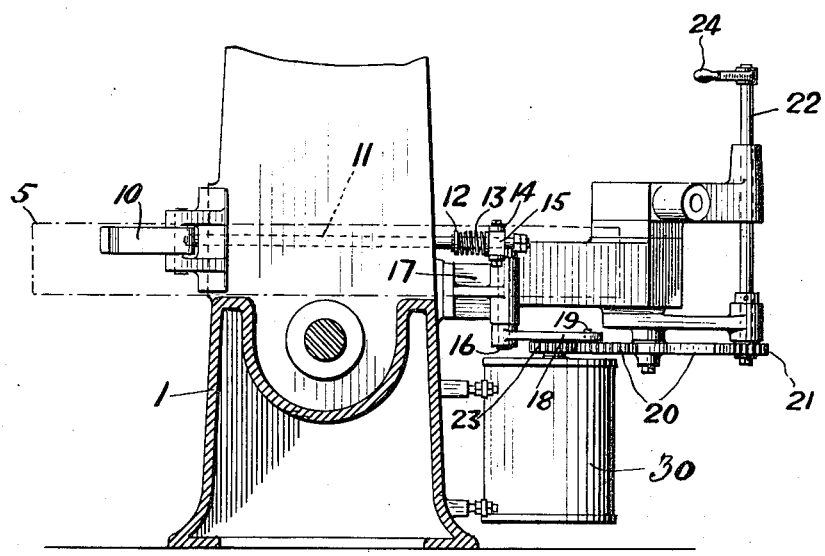
Figure 4:
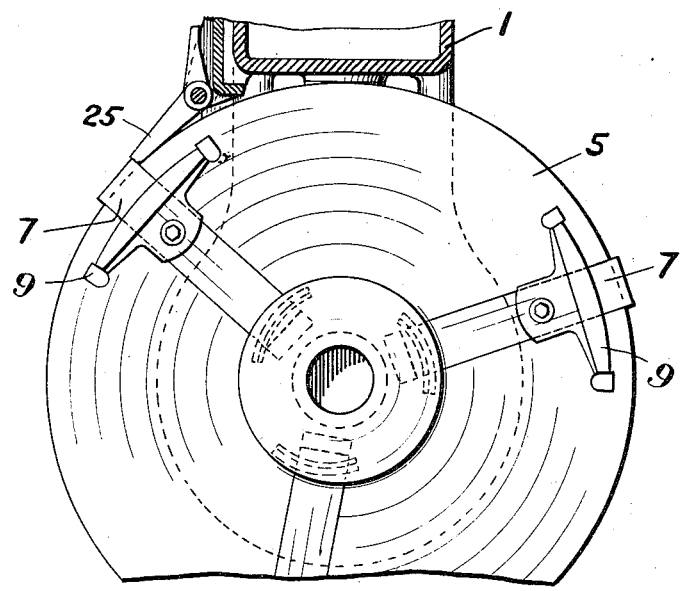

Figure 1 is a plan view of a boring mill table with my unchucking mechanism applied thereto. Fig. 2 is a vertical section on line 2—2, Fig. 1. Fig. 3 is a vertical section on line 3—3 of Fig. 1 with the table shown in broken lines. Fig. 4 is a partial plan view, showing the application of my invention to a boring mill in which the slides move inwardly to open.

1 is the mill-housing.

2 is a bushing bolted to 1 to form a center about which the table turns.

3 is the driving-wheel, which rests on the housing 1 and turns about the bushing 2 as a center.

4 is the driving-pinion, which engages with the wheel 3.

5 is the chucking-table, which centers on the driving-wheel 3 and rests upon the ring 6, which in turn rests upon the housing 1.

7, 7, 7, are the radial arms of the chuck operated by the cam-plate 8. The cam-plate is bolted to and driven by the driving-wheel 3.

9, 9, 9, are the adjustable jaws of the chuck, which are secured to the radial arms 7, 7, 7.

It will be seen from the drawings that the plate of the driving-wheel 3 is cut away at intervals to permit lugs on the table 5 to pass through and attach to the ring 6. The slots on the wheel 3 serve also as stops to limit the movement of the driving-wheel relative to the chucking-table 5. In this way the driving-wheel 3 and chucking-table 5 are both supported from the housing independently of each other, so that the chucking-table 5 may be held by the friction of its own weight and that of the work which it centers while the driving-wheel 3 rotates and tightens the jaws. When the jaws 9, 9, 9, are drawn by the cam-plate 8 and arms 7, 7, 7, against the wheel to be centered and driven, the resistance to further tightening becomes so great that the chucking-table is started by the cam-plate acting against the arms 7, 7, 7. The spiral of the cam-faces should be such that no recoil can take place, and so that the greater the resistance the tighter the chuck will hold.

The construction so far described is identical with that set forth in the Lewis patent above mentioned. In that patent it is also set forth that when the work of boring or turning is completed, a brake is applied to the driving mechanism for the purpose of checking the motion of the driving wheel 3, while the chucking-table 5, continuing to revolve, by its inertia open the chuck-jaws and releases the finished work. In my invention, however, the driving mechanism is reversed and means are provided to positively arrest the reverse motion of the table while the cam-plate continues its reverse motion to the extent required to open the chuck, and then to release the table to permit it to rotate with the chuck, the release of the table after the opening of the chuck being essential for the reason that as soon as the cams have moved to the limit of their motion relatively to the table, the latter will be positively driven and must be then free to move if an accident is to be avoided.

To arrest the movement of the table after the reversal of the driving mechanism, a latch lever 10 is pivoted on the housing, and the free end of the lever is provided with an inward-extending projection having an inclined rear face. This lever is in such position that in the reverse motion of the table its free end will drop into a pocket in the circumference of the table and lock it from movement. In the embodiment of my invention herein set forth, the pockets for the reception of the latch are formed by the guides for the sliding chuck-arms 7, the arms being set into the guides so as to be flush with the surface of the table and being of such length that when the chucks are closed on the work the ends of the slides are inside of the circumference of the table. Hence the latch, if appropriately spring-pressed or weighted, will move into the outer end portion of the first chuck-arm guide that moves opposite thereto in the reversal of the table and will bring up against the side wall of the guide and stop or lock the table from further movement. Immediately after the table has been locked from movement as described, the continuing reverse motion of the driving mechanism will cause the arms 7 to move outwardly to release the work. During this movement, the end of the slide opposite the latch lever contacts with the same and pushes it clear of the edge of the table, permitting the table to then rotate without resistance. If the latch 10 were under constant tension it would be operative, for in the normal movement of the table during boring or turning, it would drop in and (owing to the inclined rear face of its projecting end) slide out of the several pockets in the table without offering any resistance to the movement thereof. This constant frictional engagement of the latch with the periphery of the table is, however undesirable; and the following means are provided to move it into operative position by hand: The lever 10 is in the form of a bent lever pivoted between its ends. 11 is a rod one end of which is contiguous to the arm of the lever that does not engage the table. Fixed on the rod is a collar 12, behind which is a stiff coiled spring 13 surrounding the rod. 14 is a lever having forks embracing the rod and carrying a collar 15 loose on the rod back of the spring 13. By operating the lever 14 to compress the spring 13, the rod 11 will move and press against the lever 10, causing the latter to press against the periphery of the table and spring into the first pocket that comes opposite thereto in the reverse movement of the table. The latch is free to be moved out of locking engagement by the outward movement of the radial chuck-arms even if the lever 14 be locked in position, this being permitted by the compression of the spring 13. Of course, if the lever 14 is simply pressed forward by hand, and not latched, the spring would be unnecessary.

It is desirable that the lock or stop for the table be brought into operative position in the movement to reverse the controller for the driving mechanism, thereby dispensing with the necessity of a separate manipulation to bring the stop into operative position. This is effected by the following mechanism: The lever 14 is secured to a shaft 16 turning in a bearing carried by a bracket 17 bolted to the housing 1. To this shaft 16 is secured an arm 18, whose free end is in line of travel of a pin 19 on one of the segments of a double segmental gear wheel 20. One of these segments is engaged by a pinion 21 on the controller shaft 22. The other segment engages a pinion 23 on the shaft of a controller, within the casing 30, which controls the driving mechanism for the mill, which means, being old, need not be specifically set forth. On the shaft 22 is an arm 24. In the full-line position shown, the arm 24 is in the position it occupies when the machine is reversing. When the arm 24 is moved to the dotted line position, the machine is stopped. When the arm 24 is moved beyond the dotted line position, the driving mechanism is started, first to clutch the work and then to rotate it forwardly. In the motion of the control arm 24 to start the machine forwardly, the pin 19 on wheel 20 recedes from the arm 18, and lever 14 is not operated. After the arm 24 is returned to its central dotted line position and then moved beyond it to its full line position, to reverse, the pin 19 engages and moves the arm 18, turning the shaft 16 and lever 14 and moving the latch lever 10 into operative position as before described.

In some instances the chuck moves outwardly to close and inwardly to open. This is when the work is held by its inside edge instead of by its outside circumference. In such cases, the latch lever 25 (see Fig. 4) is caused to impinge against the projecting end of the chuck-arm in the reverse motion of the table, and the arm is withdrawn in the act of opening the chuck until the outer end of the arm moves substantially flush with the circumference of the table, after which the table is free to rotate.

Having now fully described my invention, what I claim and desire to protect by Letters Patent is:—

1. In a boring or turning machine, the combination with the rotatable chucking table, of chuck-jaw arms carried thereby, driving mechanism, having a limited movement independent of the table, adapted to move said arms into clamping engagement with the work and then rotate the table, and a stop adapted, in the reverse movement of the table, to hold the table from movement.

2. In a boring or turning machine, the combination with the rotatable chucking table, of means, having a limited movement relative to the table and including chuck-jaws carried by the table, adapted to be operated to clamp the jaws upon the work and then rotate the table, and a stop adapted, in the reverse movement of the table, to hold the table from movement, said stop being adapted to be engaged by one of the elements of said chuck-clamping and table-rotating means and in the reversal of said means released from locking position.

3. In a boring or turning machine, the combination with the rotatable chucking table, of sliding chuck-jaw arms carried thereby, driving mechanism, having a limited movement independent of the table, adapted to move said arms into operative engagement with the work and then rotate the table, and a stop, adapted, during the reverse movement of said driving mechanism, to arrest the movement of the table and to be released by the retraction of said arms in the continuing reverse movement of the driving mechanism.

4. In a boring or turning machine, the combination with the rotatable chucking table, of chuck-jaw operating means comprising radial grooves in the table and radial arms slidable therein, driving mechanism, having a limited movement independent of the table, adapted to move said arms into clamping engagement with the work and then rotate the table, and a stop, arranged contiguous to the periphery of the table, adapted, during the reverse movement of said driving mechanism, to engage one of the specified elements of the chuck-jaw operating means and thereby arrest the movement of the table and adapted to be released by the retraction of the radial arms in the continuing movement of the driving mechanism.

5. In a boring or turning machine, the combination with the rotatable chucking table, of chuck-jaw arms carried thereby, driving mechanism, having a limited movement independent of the table, adapted to move said arms into clamping engagement with the work and then rotate the table, a stop adapted, in the reverse movement of the table, to hold the table from movement, and means to bring the stop into engagement and to permit it to be disengaged after the chuck-jaw arms have moved to open the clutch.

6. In a boring or turning machine, the combination with the rotatable chucking table having radial open-ended grooves and chuck-jaw arms slidable therein, of driving mechanism, having a limited movement independent of the table, adapted to move said arms inwardly into clamping engagement with the work and then rotate the table, and a latch, arranged contiguous to the table, adapted, during the reverse movement of said driving mechanism, to be projected into the outer end of one of said grooves and abut against the side wall thereof, thereby locking the table and adapted, by the outward movement of said arms, to be engaged and released thereby in the continuing reverse movement of the driving mechanism and the resultant retraction of the arms from the work.

7. In a boring or turning machine, the combination with the rotatable chucking table, of means, having a limited movement relative to the table and including chuck-jaws carried by the table, adapted to be operated to clamp the jaws upon the work and then rotate the table, a stop arranged contiguous to the table, an operating lever, and a spring interposed between the lever and the stop and adapted when compressed by said lever to move the stop, during the reverse movement of the driving mechanism, into position to arrest the movement of the table, said spring yielding to permit the stop to be moved out of locking engagement.

8. In a boring or turning machine, the combination with the rotatable chucking table, of sliding chuck-jaw arms carried thereby, driving mechanism, having a limited movement independent of the table, adapted to move said arms into operative engagement with the work and then rotate the table, a stop adapted to arrest the reverse movement of the table, means to move the stop into position to perform its stopping function during the reverse movement of the table, a control lever for the driving mechanism, and means, actuated by the control lever when the same is moved to reverse the driving mechanism, adapted to render the stop-actuating means operative.

9. In a boring or turning machine, the combination with the rotatable chucking table, of means, having a limited movement relative to the table and including chuck-jaws carried by the table, adapted to be operated to clamp the jaws upon the work and then rotate the table, a stop arranged contiguous to the table, an operating lever, and a spring interposed between the lever and the stop and adapted when compressed by said lever to move the stop, during the reverse movement of the driving mechanism, into position to arrest the movement of the table, said spring yielding to permit the stop to be moved out of locking engagement, a control lever for the driving mechanism, and means, actuated by the control lever when the same is moved to reverse the driving mechanism, adapted to move the stop-operating lever to compress the spring.

In testimony of which invention, I have hereunto set my hand, at Philadelphia, on this 15th day of July, 1910.

LARS H. VOLD.

Witnesses:
HELEN FAHNESTOCK,
WARREN R. CHURCH.